United States Patent [19]

Eichlseder et al.

[11] Patent Number: 4,530,605
[45] Date of Patent: Jul. 23, 1985

[54] CHECK VALVE ARRANGEMENT FOR THE DISCHARGE END OF AN EXTRUDER, PLASTIFIER OR THE LIKE

[75] Inventors: Martin Eichlseder, Tettenweis; Erwin Bürkle, Benediktbeuern, both of Fed. Rep. of Germany

[73] Assignee: Krauss-Maffei Aktiengesellschaft, Munich, Fed. Rep. of Germany

[21] Appl. No.: 563,696

[22] Filed: Dec. 20, 1983

[30] Foreign Application Priority Data

Dec. 21, 1982 [DE] Fed. Rep. of Germany ....... 3247272

[51] Int. Cl.³ ................................................. B29F 1/02
[52] U.S. Cl. .................................... 366/79; 264/328.1; 366/77; 425/376 A; 425/564
[58] Field of Search ................ 425/207, 582, 559–564, 425/376 A, 567, 568; 366/77–79; 264/328.4, 328.12, 328.1

[56] References Cited

U.S. PATENT DOCUMENTS 3,209,408 10/1965 Kelly ....................................... 366/78
3,936,038 2/1976 Olmstead ............................. 366/79

FOREIGN PATENT DOCUMENTS 1924040 of 0000 Fed. Rep. of Germany .
1260765 of 0000 Fed. Rep. of Germany .
7237943 of 0000 Fed. Rep. of Germany .
2537912 3/1977 Fed. Rep. of Germany ...... 425/207
2342149 of 0000 France .

Primary Examiner—Jay H. Woo
Assistant Examiner—J. L. Fortenberry
Attorney, Agent, or Firm—Karl F. Ross; Herbert Dubno

[57] ABSTRACT

A check valve at the end of a plastifying worm for an extrusion or injection molding machine comprises a valve ring whose inner diameter is greater than that of a tip at the end of the head of the worm and which surrounds the neck connecting this tip with the valve seat of the worm. Spacers, preferably balls, are disposed between the ring and the tip and the surfaces of the ring and the tip flanking the balls are oriented to allow radial removal of the balls when the valve projects from the cylinder.

6 Claims, 5 Drawing Figures

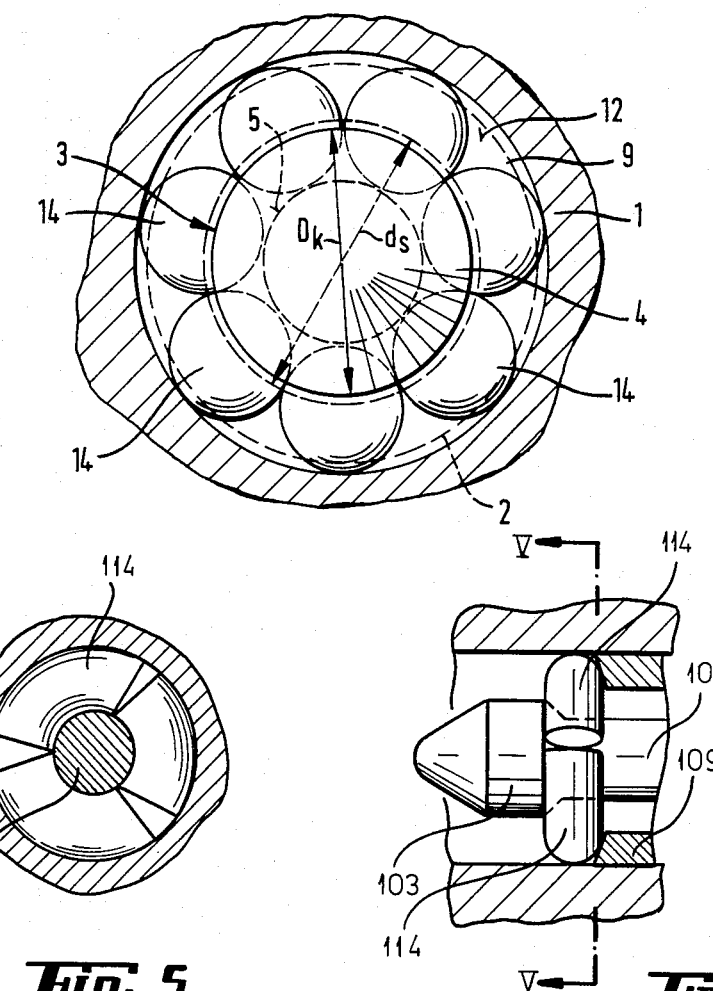

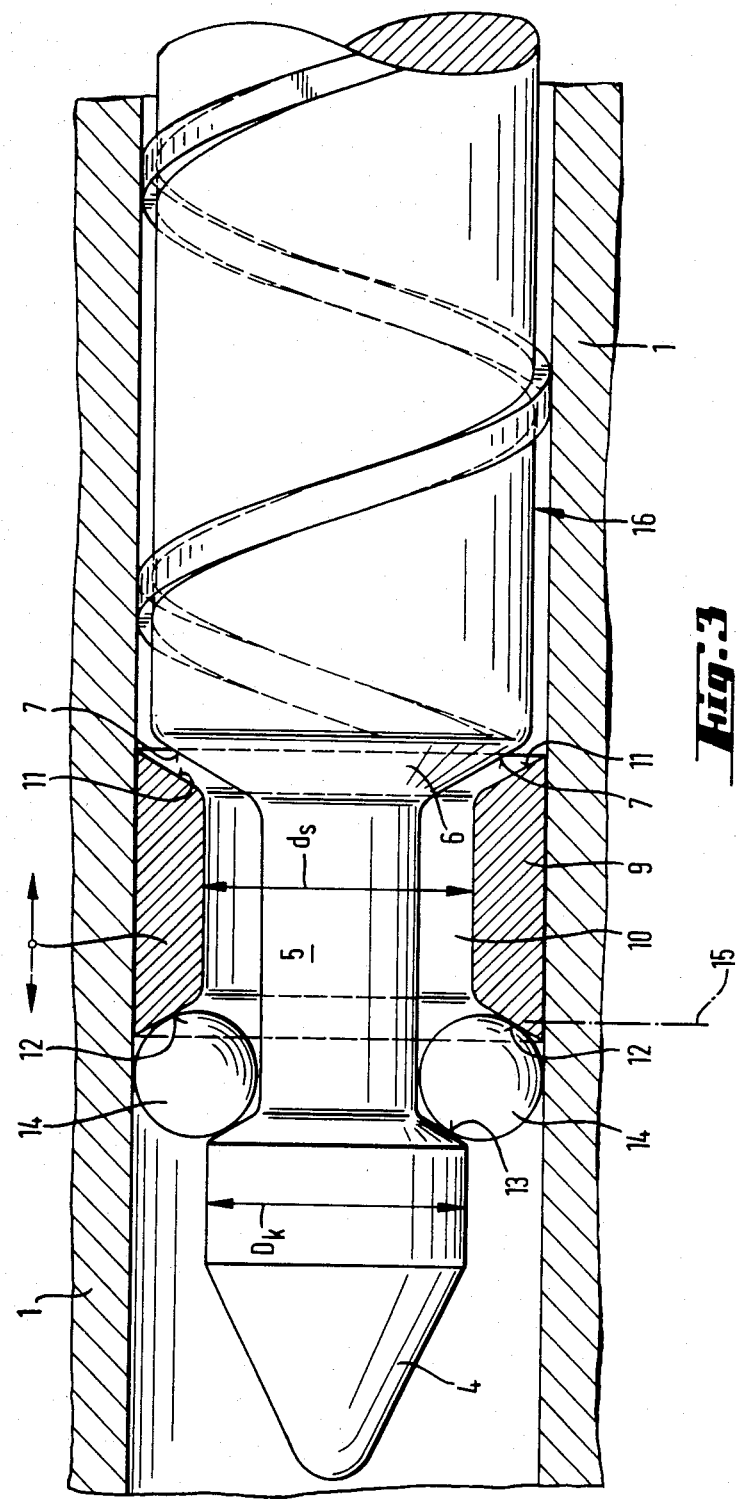

CHECK VALVE ARRANGEMENT FOR THE DISCHARGE END OF AN EXTRUDER, PLASTIFIER OR THE LIKE

FIELD OF THE INVENTION

Our present invention relates to a check valve arrangement of the type which might be provided at the end of a worm, especially of an injection molding machine, e.g. at the end of a worm or screw by means of which injection moldable synthetic resin materials are plastified or liquified.

More particularly, the invention relates to a check valve which can be provided at the end of a plastifying worm and especially a worm which is capable of rotary motion for plastifying purposes and which may be axially displaced as well.

BACKGROUND OF THE INVENTION

In U.S. Pat. No. 3,209,408 there is described a check valve for the plasticizer head of a plastic extruding machine, the check valve being formed at the end of a plastifying worm.

In this device, a worm is rotatable in the usual plastifying cylinder and homogenizes, liquifies or more generally plastifies a thermoplastic material while displacing this material to the end of the plastifying worm of a compartment at this end from which the material may be discharged, e.g. through an extrusion die or otherwise.

In this device, a conical tip is provided at the discharge end of the worm and flares rearwardly to a rearwardly facing shoulder adjoining a reduced cross section neck of this tip and a multiplicity of balls are arrayed around this neck against the shoulder. A valve ring is provided between these balls and another shoulder of the worm turned forwardly, the ring being received with lost motion between balls and this latter shoulder and a passage being defined between the ring and the neck through which the synthetic resin material can pass. The second shoulder is formed by a pressure ring against which the lost motion ring can bear and, to this end the two rings have complementary frustoconical surfaces.

The balls act as spacers holding the lost motion ring away from the forward shoulder, thereby permitting the flowable synthetic resin to pass through the spacers into the compartment ahead of the worm. The spacers of this reference thus are constituted by a peripheral array of balls similar in configuration or construction to and balls of a ball bearing so that the friction characteristics at the spacer are improved, i.e. the spacer does not create substantial friction so that the rotating worm need not entrain the lost motion or valving ring in rotation. The balls also serve to improve the kneading effect upon the synthetic resin as it flows past, between and around these balls.

In spite of precautions against wear afforded by the use of balls with the spacers, it has been found that this system has disadvantages because the relatively moving parts are subjected to significant forces which result in substantial wear. This requires replacement of the parts forming the check valve. It is also desirable to be able to easily replace the parts with different materials when different rheological properties are processed. For example, a replacement of the parts of the valve may be required to reduce the flow cross section or increase the latter.

In the earlier check valve arrangement, the replacement of the valve parts, namely the balls and the lost motion or valving member involve a complex operation in which the conical tip of the worm had to be removed, screw connections had to be detached from one another, etc. and the disassembly operations required special tools. In German patent document DE-AS No. 19 24 040, there is described a check valve located at the end of a plastifier worm whereby the replacement of the valving member or sleeve is greatly simplified. In this arrangement, an eccentric formation of a conical tip and an appropriate dimension of the clearance between the sleeve and the neck upstream of this tip, enables the sleeve to be radially shifted and withdrawn over the conical tip.

This system for dismounting the valving sleeve or ring has a considerable advantage in that no tools are required, but the eccentric arrangement presents a problem in that the flow distribution is nonuniform, canting of the ring can occur and even the wear of the device is not uniform. Another obvious disadvantage is the high cost of fabricating the device with the eccentric tip.

OBJECTS OF THE INVENTION

It is the principal object of the present invention to provide a check valve at the end of a plastifying worm whereby the disadvantages of this earlier system are obviated.

Still another object of this invention is to provide a check valve for the purposes described which can be more readily and simply mounted and dismounted, e.g. so that the parts and operating parameters can be exchanged or replaced and which nevertheless will insure uniform and reliable operation without one-sided wear, the danger of canting and like disadvantages.

SUMMARY OF THE INVENTION

These objects and others which will become more readily apparent hereinafter are attained, in accordance with the present invention, in a check valve of the type described wherein the spacers and the ring and especially the mutually engaging faces of the spacers, the ring and the shoulder engaged by the spacers are shaped so that the spacers can be removed in a radial direction, i.e. withdrawn from between the confronting surfaces of the ring and the leading shoulder, the outer diameter of the tip being less than the inner diameter of the valving ring.

More specifically, we provide a check valve at the leading end of a plastifying worm, e.g. for an extruder or injection molding machine for thermoplastic synthetic resins, which comprises a forwardly-turned upstream shoulder, a neck of a diameter less than that of the worm extending in the downstream direction and coaxial with the worm, and a conical tip formed at the free end of this neck and of a diameter larger than that of the neck, the tip being provided with a rearwardly turned downstream shoulder.

Between the tip and the upstream shoulder, a valving ring or sleeve is received, this sleeve having a frustoconical upstream end surface confronting the upstream shoulder and forming a valve therewith tending to block flow of synthetic resin against the normal flow direction from the upstream side to the downstream side when the valve ring presses against this upstream shoulder. At the downstream side, this valve ring is provided with another surface which confronts the surface of the shoulder of the tip and spacers which are interposed between the surface of the shoulder of the tip and this downstream end of the ring. It is these latter surfaces which are so shaped that they enable the spacers to be withdrawn from between them in a radial direction.

Hence mounting and dismounting is facilitated since the plastifier worm need only be advanced out of the plastifying cylinder to the point that the tip and the spacers emerge, whereupon the spacers can be removed simply by hand and the valve ring withdrawn over the tip in an axial direction.

When, according to a feature of the invention, these spacers are balls, they normally will fall out by themselves as soon as the tip clears the end of the barrel or housing.

The balls and the valve ring can thus readily be replaced, simply by inserting a new ring over the tip and inserting a number of balls into the gap between the downstream end of the new ring and the shoulder of the tip.

The parts which are replaced can be replaced in whole or in part and can provide the same flow cross section, different flow cross sections, or a modification of the stroke or lost motion of the valving ring. By turning the valve ring through 180°, moreover, and thereby changing the end of the valve ring which cooperates with the upstream shoulder or valve seat, different flow conditions can be generated. It should be obvious that no tools are required for this replacement.

The spacers can be the segments of a two-part or another multipartite ring, but preferably are balls, as noted earlier. The balls have been found to be particularly suitable for various sizes of worms and generally are relatively inexpensive.

It has been found to be advantageous to form the surfaces which confront the balls and the surfaces which provide the valve action so that they are inclined to the axis of rotation of the worm and preferably so that the surfaces between which the balls are disposed are inclined away from the axis forwardly, i.e. in the downstream direction while the other two surfaces are inclined toward the axis forwardly.

The balls and the surfaces confronting same are so dimensioned that the balls also engage the wall of the cylinder or bore in which the worm is received.

Preferably the diameter of the balls is only slightly smaller than the distance between the outer surface of the neck and the surface of the cylinder. Under these conditions, the replacement of the balls and of the valve ring is simplified while the balls can serve as bearing elements and provide a highly stable centering of the elements with respect to one another.

Since easily removable parts are provided, the tip and the neck can be formed in one piece with the plastifier worm, i.e. can be turned or fabricated when the worm is fabricated so that assembly of the tip to the worm is unnecessary. This reduces fabrication costs and provides an extremely stable arrangement even when the valve ring is a comparatively small inner diameter requiring the neck to be comparatively thin.

BRIEF DESCRIPTION OF THE DRAWING

The above and other objects, features and advantages of the present invention will become more readily apparent from the following description, reference being made to the accompanying drawing in which:

FIG. 2 is a section taken along the line II—II of FIG. 1 and viewing the check valve from the front;

FIG. 3 is an axial section through another embodiment of the invention;

FIG. 4 is a section drawn to a smaller scale illustrating still another embodiment; and FIG. 5 is a section taken along the line V—V of FIG. 4.

SPECIFIC DESCRIPTION

Figure 1:
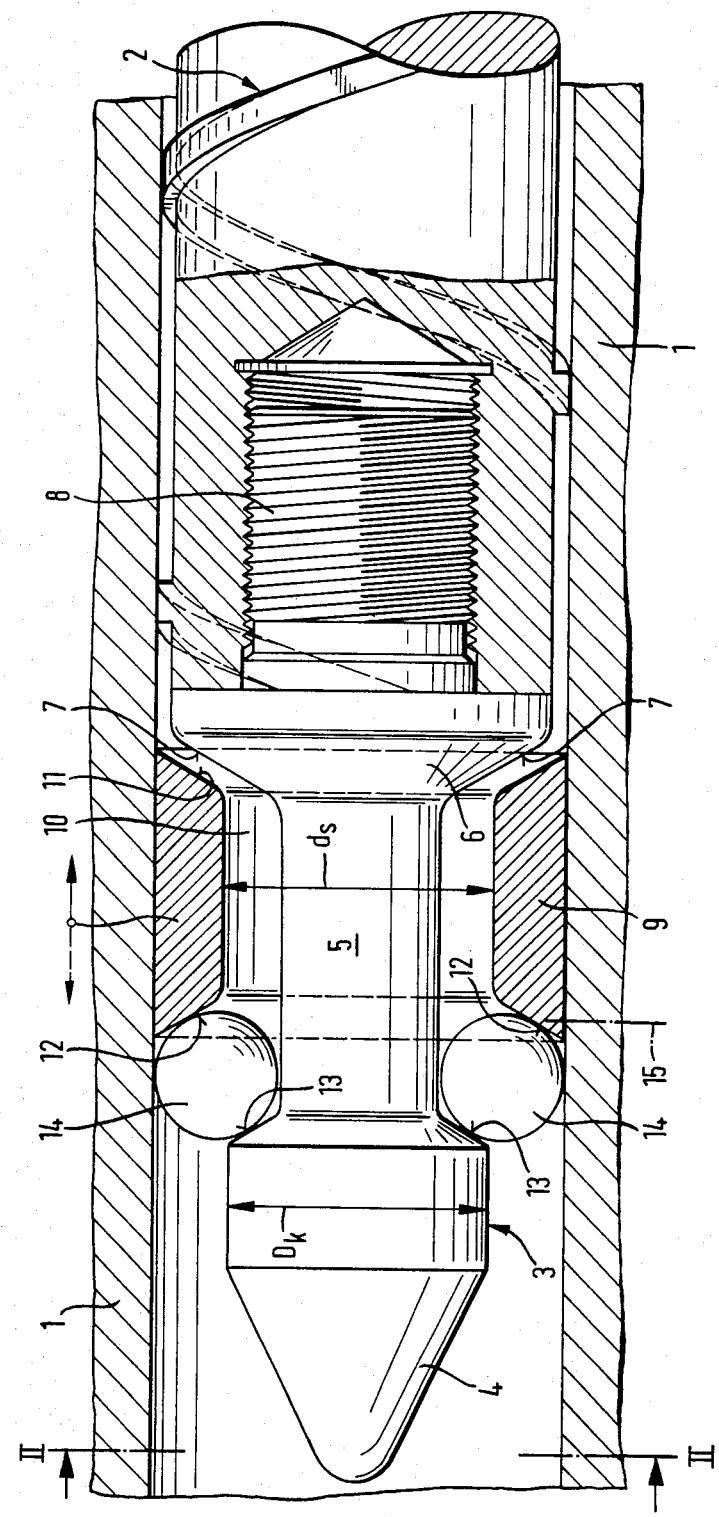
FIG. 1 is an axial cross-sectional view through a check valve at the end of a plastifying worm in accordance with the invention.

In the drawing, we have shown a plastifying cylinder for an injection molding machine capable of plastifying and liquifying a thermoplastic synthetic resin and displacing it to a compartment at the left-hand side or end of a plastifying worm 2. This end of the worm is provided with the worm head 3 which is formed with a generally conical tip 4 and is mounted at the free end of a neck 5 which is cylindrical and of a smaller diameter than the head 3.

The neck 5 connects the head 3 to a pressure ring 6 which has a seat 7 of frustoconical configuration adapted to form a valve seat as will be described subsequently. The pressure ring 6, which has a root diameter of the worm 2, is also provided with a threaded spindle 8, by which the check valve assembly is connected to the left-hand end of the worm 2.

Radially outwardly to the neck or central region 5, there is formed an annular flow passage 10 for the molten synthetic resin, this passage being defined outwardly by a valve ring or sleeve 9 which is received with lost motion in the axial direction between a rearwardly facing downstream surface 13 and valve seat or surface 7 previously mentioned.

The ring 6 is formed with upstream and downstream frustoconical surfaces 11 and 12, the surface 11 being engageable with the seat 7 to block the flow of resin in the upstream direction, the check valve thereby acting as a backflow preventer. Naturally, in normal flow conditions, the ring 9 is pressed forwardly. In this case the surface 12 engages spacers which, in the embodiments shown in FIGS. 1–3, are constituted by the balls 14 which are held by the surface 13. The surface 13 represents a transition between head 3 and the neck 5.

The surfaces described thus all are inclined to the axis of the worm at an angle of 60°.

The surfaces 12 and 13 are diverged outwardly and are parallel to one another to enable the balls 14 to be parallel to one another to enable the balls 14 to be readily withdrawn or to drop out when the check valve is advanced out of the cylinder, e.g. to the left.

The balls 14 have a diameter approximately equal to the distance between the neck and the wall of the cylinder 1 and are distributed around the neck so that they are in contact with adjacent balls and thus have statically determined orientations and likewise define the static position of the ring 9 during forward flow of the synthetic resin.

The inner diameter $d_s$ of the ring 9 is somewhat greater than the outer diameter $D_k$ of the head 3. Consequently when the check valve is advanced out of the cylinder and the balls are withdrawn or drop out, the ring 9 can be drawn over the head 3 and without tools or other aids, the balls and the ring can be replaced, e.g. by others with other dimensions.

In the embodiment of FIG. 3, the assembly of the head, the neck and the portion 6 forming the seating surface 7 are formed unitarily, i.e. in a single piece 16 with the worm.

In FIGS. 4 and 5 we have shown a further modification of the embodiment of FIG. 1 in a configuration similar to that of FIG. 3 wherein the balls are replaced by a plurality, e.g. 3 of ring segments 114 which collectively surround the neck 105 and form spacers between the valving ring 109 and the head 103.

We claim:

1. The combination with a plastifying worm in a plastifying cylinder for plastifying a synthetic resin and displacing it in a direction past an end of said worm, of a backflow preventing valve formed on said end of said worm, said valve comprising:

a valve seat formed by an upstream surface, a neck extending from said upstream surface in a downstream direction, and a tip mounted on said neck and having a downstream surface turned toward said upstream surface;

a valving ring disposed between said surfaces and engageable with said seat while surrounding said neck with clearance to define a flow passage for said resin between said neck and said ring; and spacer means between said ring and said downstream surface, said downstream surface and a confronting complementary surface of said ring being shaped to enable radial removal of said spacer means upon the emergence of said valve from said sealing, said ring having an inner diameter greater than the outer diameter of said tip, said spacer means comprising a plurlaity of balls received between said downstream surface and said complementary surface of said ring, said downstream surface and said complementary surface being frustoconical and diverging outwardly from said axis to a downstream direction, said downstream surface, said neck, said complementary surface and said cylinder being so dimensioned that said balls bear radially directly against said cylinder and said downstream and complementary surfaces being substantially parallel.

2. The combination defined in claim 1 wherein said balls have diameters only slightly less than the distance between said neck and said cylinder.

3. The combination defined in claim 2 wherein said tip, said neck and said seat are formed in one piece.

4. The combination defined in claim 3 wherein said one piece is unitary and one piece with said worm.

5. The combination defined in claim 1 wherein said tip, said neck and said seat are formed in one piece.

6. The combination defined in claim 5 wherein said one piece is unitary and one piece with said worm.

* * * * *